Patented Feb. 24, 1953

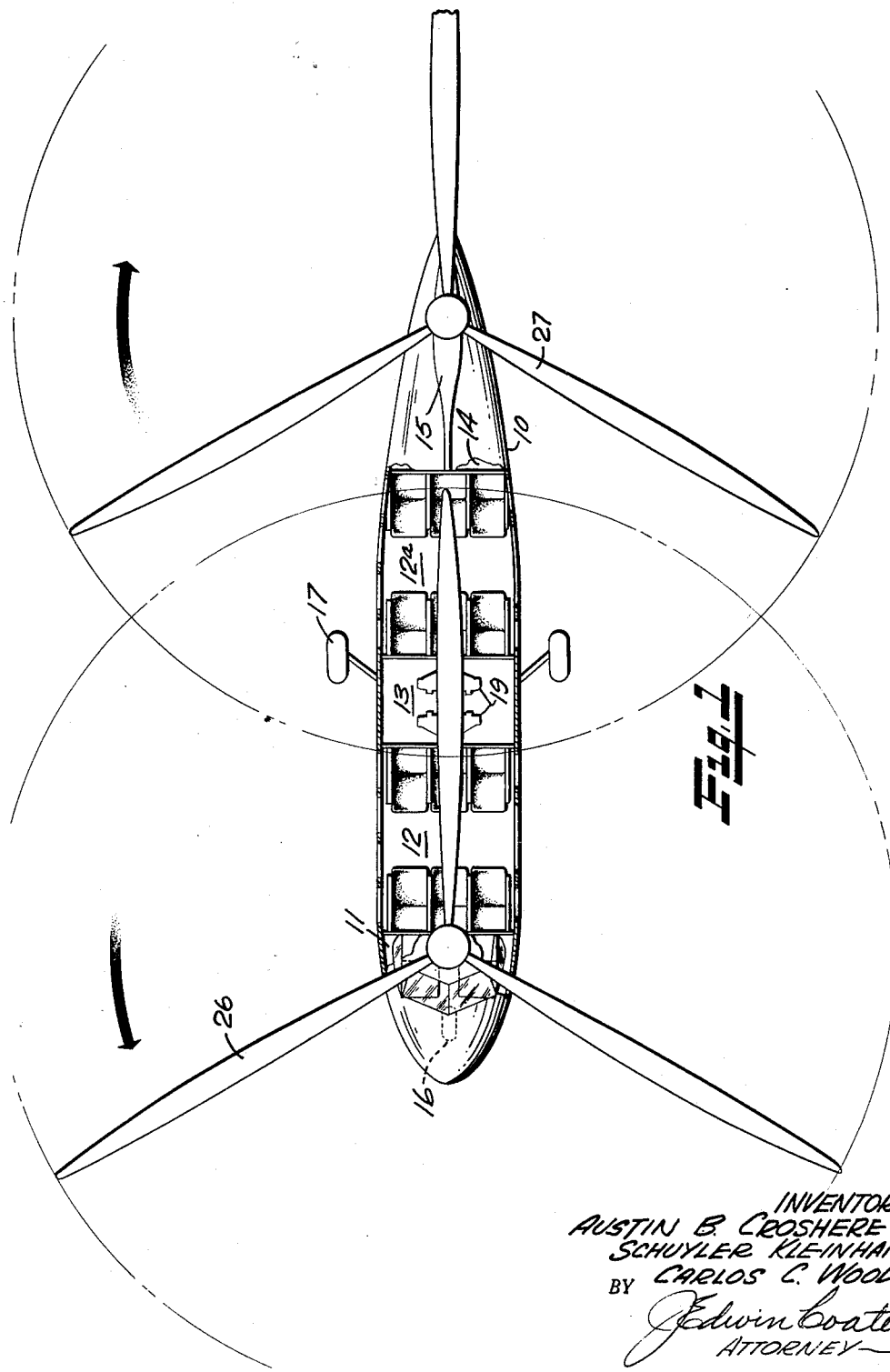

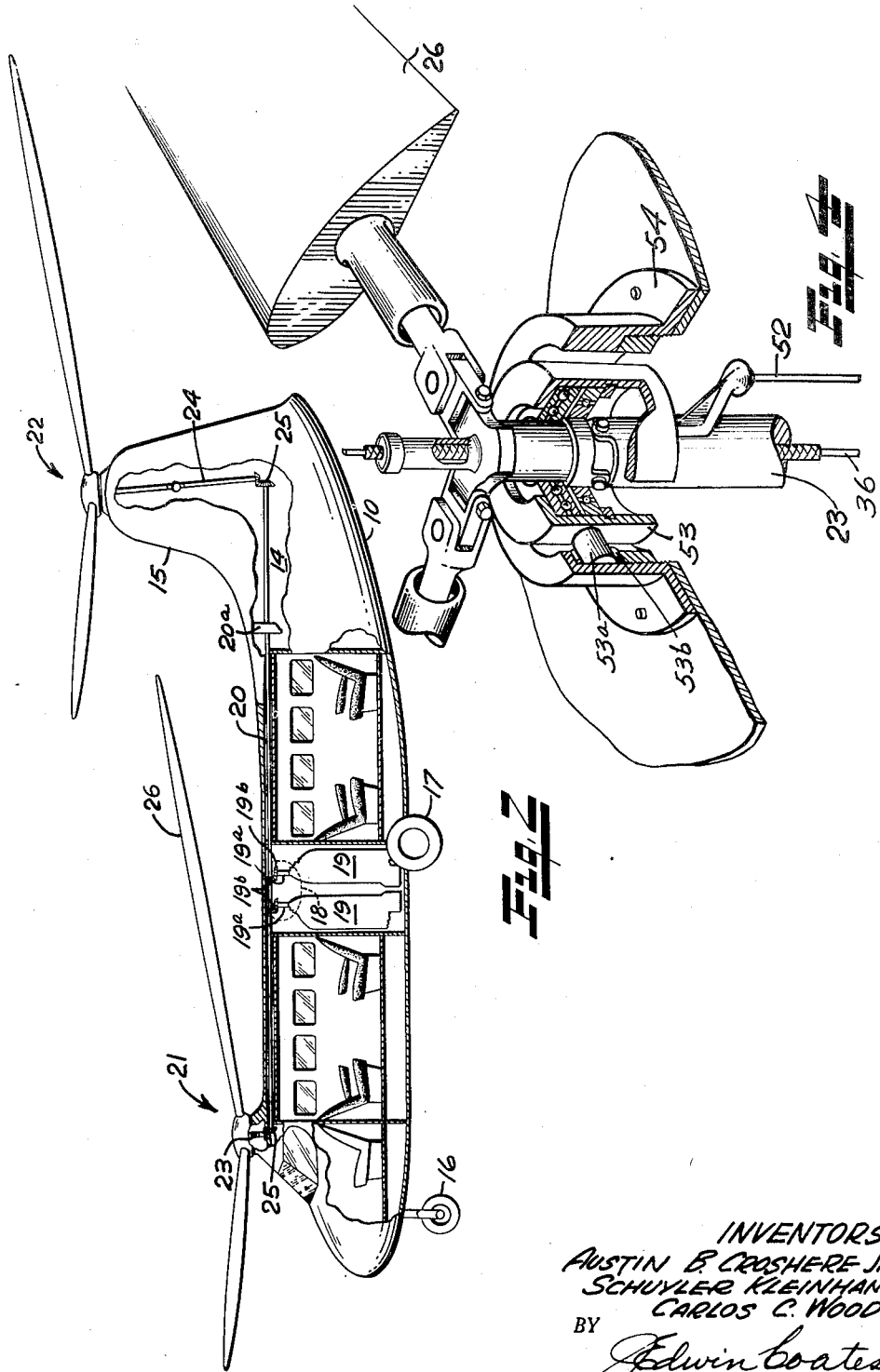

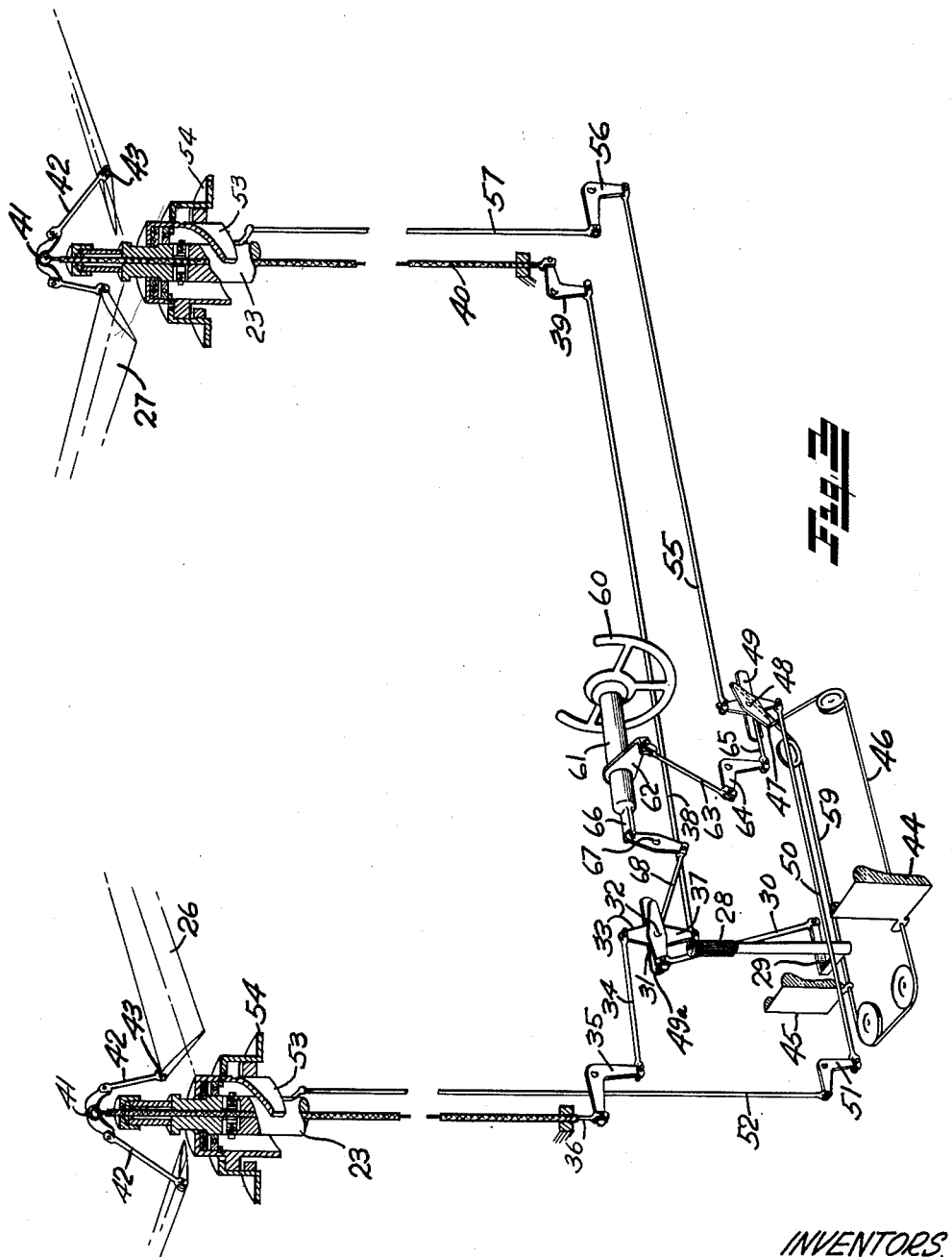

2,629,568

UNITED STATES PATENT OFFICE 2,629,568

TANDEM ROTOR HELICOPTER

Austin B. Croshere, Jr., and Schuyler Kleinhans, Santa Monica, and Carlos C. Wood, Brentwood Heights, West Los Angeles, Calif., assignors to Douglas Aircraft Company, Inc., Santa Monica, Calif.

Application August 10, 1946, Serial No. 689,636

9 Claims. (Cl. 244—17.23)

This invention relates to aircraft sustained by direct-lift, rotary airfoils, and is particularly concerned with helicopters, although, as hereinafter made apparent, it can equally well be incorporated in autogiros, gyroplanes, and the like.

Antecedent helicopters are incompletely stable, both statically and dynamically, and are especially unstable longitudinally. Those having a modicum of such stability, almost invariably permit but a limited range of the location of the design center of gravity. Beyond this range, the helicopter becomes as unstable as the archetype.

They are difficult to control and to trim, and have a restricted amount of maneuverability. For example, some helicopters are equilibrated or trimmed to compensate for imbalance by maintaining the rotor heads tilted throughout the flight. The amount of further movement thereof left available for maneuvering purposes is thereby seriously reduced. Rotor head tilting is also employed to trim such craft upon encountering gusts, or other disturbances in the airstream. The latter practice necessitates substantially continual manipulation of the rotor-head control, restricting the degree of maneuverability and precluding achievement of the much sought "hands off" condition.

In the conventional tandem rotor helicopter, the rotor disks lie in one and the same horizontal plane, with the rotor blades indexed, the rotors being driven by an interconnecting drive shaft. Consequently, if the rotors de-phase, or if one ceases to rotate, collision occurs between the blades thereof. Moreover, in quite a number of attitudes of such craft, the downwash from one rotor impinges upon the other, or seriously disturbs the airstream entering same. Such action reduces the efficiency of the affected rotor to an extent sometimes sufficient to render same ineffective.

The housing and ground handling of conventional helicopters is a rather difficult and expensive matter. Those which include rotors arranged laterally, or side-by-side, have such a span in proportion to their length as to render housing relatively complex. Conventional tandem rotor helicopters ordinarily have such a relatively great length as to give rise to considerable difficulty in ground handling.

The present invention obviates all these disadvantages and provides an improved tandem-rotor type, direct-lift aircraft which is so stable, so maneuverable, and so satisfactory in every other essential respect, as to be universally desirable and adaptable for all uses to which rotary wing aircraft heretofore were only theoretically applicable.

To achieve these ends, the helicopter is, first of all, rendered completely stable longitudinally, both statically and dynamically. Briefly, to achieve static longitudinal stability, the center of gravity of the craft is so located and the aft lift-unit is so constructed and operated as to have a blade loading coefficient, $C_t/\sigma$, less than that of the forward unit. The blade loading coefficient of a helicopter rotor is usually expressed as, $C_t/\sigma$, which is the ratio of thrust coefficient, $C_t$, thereof, to its solidity ratio, $\sigma$. The solidity ratio, $\sigma$, is the ratio of the actual area of the blades, to the rotor disk area. The thrust coefficient, $C_t$, can be derived from its quantitative equality to the mononomial, $$\frac{32T}{\pi C W^2 D^4}$$

wherein T is the developed thrust of the rotor in pounds, C represents air density in slugs/ft.$^3$, W is the rotor angular velocity in radians per second, and D is its diameter in feet. $C_t/\sigma$ thus is a function of the design and mode of operation of the rotor.

The presently preferred manner of bringing about the differential in blade loading coefficients of the rotors as mentioned above is to first determine a suitable diameter, blade planform, and rotational speed for the forward unit with the angle of attack of the blades so set as to produce the required lift. The diameter of the aft unit is preferably the same as or somewhat smaller than that of the forward unit, although this is not an essential requirement. The planform of the blades is similar to that of the blades of the forward unit, but the rear blades preferably have a slightly lower aspect ratio, resulting in a correspondingly higher solidity ratio.

The blades of the aft unit are set at an angle of attack less than that of the forward blades, preferably by several degrees, resulting in a lower thrust coefficient. In order to sustain the total load placed on the aft unit, it is rotated at a higher speed than the forward unit. It will be observed from a consideration of the formula above that the thrust coefficient varies inversely as the rotational speed. Therefore, with the solidity ratios of the forward and aft units determined, the desired result, $C_t/\sigma_{forward} > C_t/\sigma_{aft}$, is obtained by providing a lower angle of attack of the rotor blades and a higher rotational speed in the aft unit than in the forward unit.

Since the angle of attack of the forward blades is greater than that of the rearward blades, any given increment of pitching up of the nose of the craft will produce a smaller percentage increase of lift in the forward unit than in the aft unit. The excess lift in the aft unit will therefore raise the tail until the craft is again in horizontal trim. Similarly any pitching down of the nose of the craft will act in the reverse sense to lower the tail of the craft until it is again in horizontal trim.

One of the outstanding advantages of an aircraft built and operated in accordance with the present invention is that the center of gravity location can be varied throughout an extremely wide range while retaining not only balance but also static longitudinal stability. As the C. G. is moved rearwardly from any predetermined position, the total load on the forward unit decreases and the total load on the aft unit increases. Balance is obtained by increasing the thrust of the aft unit through increase of the pitch or the rotational speed or both, but the pitch of the aft rotor is always maintained less than that of the forward rotor. By doing so, the $C_t/\sigma$ of the aft unit is at all times held to a value less than that of the forward unit and therefore static longitudinal stability is maintained under all circumstances.

The craft will at the same time be endowed with dynamic longitudinal stability, by virtue of the differential in vertical velocities conferred on the rotors, when the craft pitches, by the longitudinal separation of the two differentially loaded rotors, having the above mentioned differential of blade-loading coefficients.

By means made manifest hereinafter, the craft is also endowed with directional and lateral stability, of both the static, and the dynamic, variety.

These high degrees of stability render available an unusually wide range in the choice of location of the center of gravity, this range being restricted only to that in which the gravity-altered rotor thrusts remain such that the blade loading coefficient of the rear rotor is less than that of the forward rotor.

The helicopter dually includes control means providing a wide range of maneuverability, and trimming means which may be operated to trim the craft about all three axes without impairing maneuverability or requiring continual control operation. Certain maneuvers can be effected by collective pitch changes of the blades of the rotors and the other maneuvers can be accomplished by actual or virtual tilting of the rotor heads. The latter operation may be accomplished by suitable cyclic pitch changes. The sum total enables the craft to be flown in any desired direction in space, moving, in certain directions, parallel to itself in horizontal trim; in other directions, following its nose like an airplane; and is also capable of rearward movement, following its tail.

The craft may, if desired, be trimmed by merely changing the pitch of the rotor blades, either collectively or cyclically, instead of bodily tilting the entire rotor head as in prior helicopters.

The rear rotor lies in a horizontal plane elevated above that of the forward rotor, the blades of the two rotors overlapping longitudinally of the craft. The overall length of the helicopter is thereby reduced to the minimum possible for a tandem-type helicopter. Moreover, the blades of the rotor disk cannot collide upon the occurrence of rotor de-phasing or upon stoppage of one of the rotors, and the downwash from the forward rotor has but the minimum effect upon the rear rotor or upon the free airstream flowing to the rear rotor. Although the rear rotor overlaps the forward rotor and hence would theoretically have an adverse aero-dynamic effect thereupon, actually its interference therewith is of the minimum order, except under unusual flight conditions or attitudes of the craft.

The power plant, the transmission system, and the control and trimming system are so constructed and arranged as to leave available in the fuselage, a relatively large volume of space for disposable loads, so that the commercial, as well as the military, desirability of helicopter-type aircraft is greatly enhanced by the present craft.

The other characteristics and accomplishments of the invention will be made manifest as this specification proceeds.

For the purpose of exemplifying the foregoing and other concepts, one of the presently preferred embodiments of the invention is illustrated in the accompanying drawings and described in detail hereinafter. It is to be understood, however, that these drawings and this description are representative merely, the invention being limited in the embodiments which it can take, solely by the scope of the sub-joined claims.

In these drawings:

Figure 1 is a sectional plan view of the helicopter, showing in each lift-station but one of the plurality of rotors incorporatable in each such station.

Figure 2 is a fragmentary sectional side view thereof;

Figure 3 is a diagrammatic perspective view of a system employable for effecting blade pitch changes and for rotor head tilting to control and trim the craft, and Figure 4 is an enlarged detail of a rotor head.

Referring more in detail to the construction shown in the drawings, the helicopter includes, as its basic structural member, a fuselage 10. The fuselage is partitioned, or otherwise suitably divided, into a pilot's compartment 11 in the nose thereof; a forward passenger compartment 12 just aft of the pilot's compartment; an engine room 13 located substantially medially of the length of the fuselage; an aft passenger compartment 12a substantially identical with the forward passenger compartment; and a baggage compartment 14 extending from the aft end of the aft passenger compartment to the tail of the fuselage. The fuselage has cross-sectional and longitudinal contours corresponding closely with those of the most aerodynamically satisfactory airliners, and accordingly has a generally pointed nose with an indentation providing visibility for the pilot; a substantially cylindrical central portion; a rearwardly pointed tail portion and intermediate surfaces smoothly aerodynamically merging the nose portion and the tail portion with the cylindrical central portion. The upper surface of the aft portion of the fuselage bears a fin 15, which may be continued forwardly and dorsally.

The helicopter may be provided either with a conventional landing gear or with the illustrated tricycle type landing gear, comprising a nose wheel 16 mounted on a landing leg retractable forwardly and upwardly into a wheel well, not shown, but located in the lower portion of the pilot's compartment, substantially in the plane of symmetry of the fuselage. The other two wheels 17 of the tricycle landing gear are suitably connected to the fuselage by collapsible landing legs so constructed as to permit retraction of these wheels into wheel wells 18 located in the upper outer portions of the engine room wall.

The engine room contains a power plant 19, here shown as comprising two vertically disposed, in-line internal combustion engines each having a crankshaft 19a connected by suitable miter gearing 19b to a longitudinally extending drive shaft 20. Located at any suitable point on the drive shaft 20 is a continuously and universally variable, speed-change gear box 20a of any well-known type suitable for the purpose, such as "Transit-torque" gear box, or its equivalent. The purpose of this variable speed gear unit is to enable rotation of that portion of shaft 20 which lies aft of the box at speeds differing from those of the front portion of the shaft, in order to enable the aft rotor, usually rotating in the opposite direction from the forward rotor, to be turned at speeds equal to, greater than, or less than, those of the forward rotor, according to the chosen center of gravity location, in order to vary the concomitant blade-loading coefficients as desired.

A forward rotor 21 is mounted near the nose of the fuselage substantially vertically above the pilot's station and another rotor 22 is mounted near the tail of the fuselage closely adjacent the crown of fin 15. The forward rotor unit includes a rotor shaft 23 suitably rotatably supported in thrust and radial bearings mounted in the structural framework of the fuselage. The aft rotor includes a rotor shaft 24 similarly suitably mounted and supported in the framework of the aft portion of the fuselage. Each rotor shaft, at its lower end, is connected to the longitudinally extending drive shaft 20, as by means of miter gears 25. Again, if desired, the drive shaft 20 may be connected to the engine shafts by movable drive couplings, not shown but of any suitable conventional type, in order to enable the power plant to be shifted to any desired location lengthwise of the fuselage, whereby to enable varying the center of gravity location from the designed location thereof, if it is desired to thus trim the craft.

The rotor shafts, in the example illustrated, are disposed in the plane of symmetry of the fuselage, that is, in the vertically-lying, longitudinally extending, central plane of the body. Each shaft has a forward tilt of the same degree, and in the exemplary embodiment, of a value on the order of 5°, so that both rotor disks are normally inclined forwardly to thereby provide forwardly directed flight.

The hub of the forward rotor head supports three rotor blades 26, each having substantially the properties and configuration of enlarged conventional auto-rotative helicopter sustaining airfoils, but having a higher $L/D$ ratio and efficiency, and flexible longitudinally. These airfoils may be of the framed, or fabricated types, if desired. The swept area, or disk, of this rotor is inclined forwardly and downwardly, as mentioned. The blades 26 are normally all of the same diameter, plan form, airfoil sectional contour, and other aerodynamic characteristics.

The hub of the rotor and the roots of the blades are constructed in such manner as to enable the blades to be axially rotated in their mountings in the hub to thereby vary their pitch or angle of attack through a wide range, either in the positive sense or in the negative sense, and either collectively or cyclically, the cyclic pitch changing means not being shown. Means operable by the pilot for effecting these rotations of the blades about their longitudinal axes and for bodily or actually tilting the rotor head are described hereinafter in connection with a description of the manner of controlling and trimming the craft. It is to be understood that the invention also contemplates virtual tilting of the rotor heads, by any of the well-known means available for this purpose.

The hub of the rear rotor similarly supports three rotor blades 27. These blades are all of the same length, and are essentially like the blades 26, in airfoil cross section and construction. However, blades 27 are shorter and wider than blades 26, by an amount approximately 5% thereof, in the example shown, and the rear rotor has a higher solidity ratio, and a lower $C_t/\sigma$ than the forward rotor. The rear rotor is provided with control means similar to those provided for the forward rotor, for effecting collective and cyclic pitch changes of its blades.

The fixed and disposable loads of the craft are preferably so located as to dispose the center of gravity somewhat ahead of the midpoint between the axes of the rotors, to assist in causing the rear rotor to operate at a lower blade loading coefficient than that of the front rotor. The normal range of location of the C. G. is from 20% to about 50% of the distance between the rotors so that the forward rotor sustains from about 80% down to about 50% of the total helicopter weight, while the aft rotor sustains from about 20% up to about 50% of the total weight. It is to be understood that the center of gravity can be displaced aft of this 50% point, if desired, if the rear rotor is, under this condition, overspeeded or has its angle of incidence increased to compensate in accordance with the shift in the location of the center of gravity.

The features that confer differential blade loading coefficients on the rotors endow the craft with static and dynamic stability of a high order. For example, the provision of a lower blade loading coefficient, $C_t/\sigma$ in the rear rotor than the forward one, confers upon the craft inherent static longitudinal stability. Hence, as explained above, when the tail of the craft is thrown upwardly by a gust, "bump," or the like, the rear rotor undergoes a larger percentage of decrease of lift than does the forward rotor, although the angle of attack of the blades of each rotor is decreased by the same amount.

This follows from the fact that the blade loading coefficient of the rear rotor is made less than that of the forward rotor by properly relating the sizes, shapes, angles of attack, and rotational speeds as explained more in detail in the preamble. When the craft pitches, the attitude of each rotor changes the same total amount and consequently the rotor having the lesser unit blade loading coefficient experiences a greater percentage change in lift. Since the relation of the moment arms remains the same, the relative lift moment of the rear rotor with respect to that of the forward rotor decreases and thus allows the tail of the craft to sink back to the horizontal trimmed attitude. When the tail of the craft is depressed by a gust, "bump," or the like, the angle of attack of each rotor is increased by the same amount, but the percentage of increase of the lift coefficient occurring in the rear rotor will be greater than the percentage of increase thereof in the front rotor. Accordingly, the tail will rise, restoring the craft to the horizontally trimmed attitude, and the dynamic stability will prevent "hunting" thereof.

Dynamic longitudinal stability is built into the craft and will, by damping the longitudinal restoring moments described above, prevent its oscillating about its horizontal trim-position, or hunting, during the aforedescribed actions. This damping is provided by virtue of the differential in the vertical velocities of the rotors, conferred upon the rotors when the craft pitches, by the longitudinal separation of the two rotors having differentiated blade-loading coefficients. When the craft is being restored to trim by this separation and differential blade loading coefficient of the rotors, the relatively high vertical velocity tendency of the lightly loaded rear rotor confers upon it, among other things, a greater percentage of increase of resistance to displacement from restored trim position than is conferred upon the forward rotor, that is; the restoring, unbalanced thrust of the rear rotor is returning to the balanced amount at a more rapid rate than the thrust of the forward rotor, and the thrust of both rotors reaches proper balance at the instant of returning to trim position, the result being a damping of the tendency to oscillate or hunt. Moreover, the differential in vertical velocities causes the rear rotor to lose lift more rapidly than the forward rotor, so that although the tail of the statically stable craft may tend to continue upwardly, or dynamically oscillate or hunt after having been restored by its longitudinal static stability to longitudinal trim from a lowered position, it will instead immediately sink back to trimmed position. All the oscillations from horizontal of the statically equilibrated craft that would otherwise occur, are thereby reduced to zero at their inception. These influences are supplemented by the damping effect of the large total horizontal-plate equivalent of the rotor disks.

The fin 15 and its dorsal extension provide static directional stability of a sufficient magnitude to counteract ordinary yawing moments. If desired, however, both rotor heads may be tilted laterally in opposite directions to augment the basic stability provided by the fin construction and arrangement, and they then overcome extraordinary yawing moments. Dynamic directional stability may be provided by these same means, supplemented by the relatively large keel area, or vertical plate equivalent of the projected side area, of the relatively long fuselage, of the fin, and of the rotors.

Lateral stability, about the fore-and-aft axis, is provided by the fact that the craft is sustained by the two rotors in a pendular condition, suspended from the upwardly-coning rotor disks, each of which includes an appreciable lateral dihedral angle equivalent. This dihedral angle functions in a manner similar to the dihedral angle of airplane wings.

Control of the craft for most maneuvering purposes is preferably effected by bodily tilting the rotor heads in those directions which produce the necessary forward, rearward or lateral components of the rotor thrust. For effecting upward or downward translation parallel to itself, however, means are provided for collectively changing the pitch of the blades in both rotors in the same positive or negative sense and to the same degree, while for pitching the craft forwardly or rearwardly or moving same forwardly or rearwardly in a diving or climbing maneuver, collective pitch changes, differential as between rotors, are effected, although the latter maneuverings may be, if desired, effected by bodily tilting the rotor disks or virtually tilting them through suitable well-known cyclic pitch changes of the rotor blades.

A representational showing of a control system suitable for implementing the aforesaid concepts is presented in Figure 3, in which the rotor drive shafts may be constituted by the shafts 23.

The simplest maneuver, that of ascending or descending the craft parallel to itself, is effected by backward or forward movement of a control column 28, disposed near the pilot, the movements of which column respectively collectively increase the pitch of the blades of both rotors to the same degree and collectively decrease same. To this end, the lower end of column 28 is pivotally mounted on suitable fuselage structure and bears a right-angled arm 29 to the rearward end of which is pivoted the lower end of a link 30. The upper end of this link is pivoted to the forward arm 31 of a four-armed star crank 32, rotatably and slidably mounted on adjacent framing in the fuselage, not shown. To the upper arm 33 of the star crank is pivotally attached the one end of a link 34, the other end of which is pivotally connected to the lower arm of a bell-crank 35. To the other arm of this bell-crank a vertically extending, flexible, "push-pull" member such as a Bowden wire or Ahrens cable 36 in the forward rotor is pivotally attached. The lower arm 37 of the star crank has a rearwardly extending link 38 attached thereto. This link leads to a bell-crank 39 adapted to operate a cable similar to cable 36 and designated 40 in the rear rotor. The members 36 and 40 extend operatively through the shafts 20. The upper end of each of the vertical members 36 and 40 pivotally supports a three-armed cross-head 41, from the outer end of each arm of which depends an operating link 42. The lower end of each link 42 is pivotally connected to a suitable arm 43 on the entering edge of each rotor blade.

With this construction and arrangement of parts, collective pitch increase in both rotors is achieved by a pull upon column 28, resulting in tensioning link 30 rotating star crank 32 counterclockwise, compressioning link 34, rotating bell-crank 35 clockwise and elevating the member 36, concurrently compressioning link 38, rotating crank 39 counterclockwise, and elevating member 40. The shifting of the vertical members terminates in a lifting of the entering edge of each of the rotor blades, to the same degree, by means of the links 42 and arms 43.

Collective pitch decrease in both rotors is effected by pushing column 28, instead of pulling same, thus reversing the action of the aforedescribed linkage.

Turning left or right in the horizontal plane is accomplished by operating pedals 44 and 45, respectively, thereby actuating a cable and linkage system operatively associated therewith. In order to effectuate a left-turn, pedal 44 is pushed forwardly, thereby tensioning a cable 46 suitably led to the forward arm 47 of a four-armed star crank 48 suitably mounted, in a slot 49 in the fuselage, for both rotation and bodily displacement. The resultant counterclockwise rotation of the star crank tensions a link 50 pivotally attached to its lower arm, causing counterclockwise rotation of a bell-crank 51, to the forward arm of which is connected a link 52. The upper end of the link 52 is connected to the left side of a hub 53. This hub is, by means of trunnion 53a, mounted for lateral tilting, to the left and right, in seats 53b in a casing 54 which is fixed to sub-adjacent fuselage structure. Thus, the downward motion of the link 52 will tilt the hub leftwardly, therefore tilting the forward rotor bodily to the left. Concurrently, the counter-clockwise rotation of the star crank pulls a link 55 attached to the upper arm of the star, rotates a bell-crank 56 clockwise, and pushes up a link 57 attached to the left side of a hub 58 which is similar to the aforementioned hub and similarly mounted in the rear rotor, thus tilting the rear rotor bodily to the right. The oppositely-acting horizontal components of the leftwardly and rightwardly inclined rotor thrusts, of course, constitute a couple acting to turn the nose of the craft leftward in the horizontal plane, the craft thus executing a left-turn while remaining in longitudinal and lateral trim.

A cable 59 is operatively interposed between the right pedal 45 and the rear arm of the star crank 48, whereby same is rotated in the reverse direction when the right pedal is pushed, thereby eventually tilting the forward rotor-hub and disk to the right and the rear rotor hub to the left. A rightwardly or clockwise acting couple is thereby set up around the center of gravity of the craft, effectuating a right turn thereof, the craft remaining in longitudinal and lateral trim.

Means are provided for bodily simultaneously tilting the rotor heads laterally in the same direction, in order to bodily translate the craft rightwardly or leftwardly parallel to itself or to bank the craft right or left, depending respectively upon whether the rotor disks are tilted only a small amount or a large amount. To these ends, a wheel 60 is rigidly attached to a horizontal shaft 61 axially rotatably mounted in fuselage structure adjacent the pilot's station. An arm 62 is rigidly attached to the shaft and extends laterally therefrom. A link 63 is pivotally connected at the one end to this arm and at the other, to the upper arm of a bell-crank 64, suitably mounted on adjacent fuselage structure. The lower arm of the bell-crank is pivotally connected to the center of the star crank by means of a connector link 65. Thus, turning wheel 60 to the left slides the four-armed star crank 48 rearwardly in the slot, tensioning link 50 and ultimately, through the crank 51 and rod 52, tilting the hub and rotor disk of the forward rotor to the left. At the same time, the rearward movement of the star crank 48 in its slot subjects link 55 to compression, turning the bell-crank 56 in the counterclockwise direction and hence pulling the leftward half of the hub 58 downwardly, thus tilting the rear rotor leftwardly also. The leftwardly directed horizontal components of the thrust of the rotors, will, if the wheel is turned only a slight amount, effectuate leftward translation of the craft, whereas if the wheel is rotated widely, a left bank will ensue, which can be employed either to trim the craft laterally, whereafter the wheel is restored to neutral, or to enable observation over the left side of the craft.

Reverse rotation of the wheel 60 will, of course, effect rightward translation of the craft parallel to itself, or accomplish a right bank, since both rotor disks are thereby tilted to the right.

The shaft 61 is also mounted to permit axial displacement of it and the wheel carried thereby, both forwardly and rearwardly. A forward push of the wheel will pitch the craft forwardly, forward end downward, the helicopter pitching forward, moving forward horizontally, or climbing, depending upon the power employed in the rotors, and upon the extent to which the control is urged forwardly.

Means for implementing this concept comprise an extension 66 of the shaft 61, pivotally connected to the upper end of lever 67. Lever 67 is rotatably mounted in its medial portion on fuselage structure, and its lower end is connected to the center of the slidable four-arm crank 32 by means of a link 68. Thus, forward movement of the wheel results in rearward sliding of the four-arm crank, in tensioning of link 34 and, ultimately, in reduced pitch of all the blades of the forward rotor. Concurrently, the rearward movement of the four-arm link pushes link 38 rearwardly and increases the pitch of all the blades of the rear rotor. The resultant effect is a lessened lift on the forward rotor and augmented lift in the rear rotor, producing the desired amount of forward pitch of the craft to enable, according to the rotor-power employed, diving, horizontal forward flight, or climbing.

In order to pitch backward to enable, with suitable rotor-speed variation, rearward pitching, rearward horizontal movement, or rearward climbing, the wheel is respectively, pulled back a slight amount, a greater amount, or a still greater amount, in any of these cases tensioning extension 66, rotating lever 67 clockwise, sliding the four-arm crank 32 forwardly in its slot 49a, pushing link 34 forwardly, and rotating bell-crank 35 clockwise, thus effecting increase of pitch in the forward rotor. At the same time, the mechanism shown accomplishes a decrease of pitch in the rear rotor, thus effecting the desired rearward pitching, which can be transformed into rearward horizontal movement, diving, or climbing by suitable use of rotor speed as aforesaid.

If desired, the wheel and shaft may be replaced by a conventional control stick. The linkage is then suitably rearranged to transform the forward and backward tilting of the stick into the desired rotor blade pitch changes.

The invention also contemplates that, instead of effecting forward or rearward pitching by effecting pitch change of all the blades of each rotor but differentially as between rotors, same may be accomplished by tilting the rotor disks forwardly or rearwardly, either bodily or virtually, the latter by suitable known mechanism for effecting cyclic longitudinal pitch change in each rotor.

Autorotation of the rotors may also be accomplished, to effect a parachute-like descent of the craft. To this end, the rotor heads may be uncoupled from the rotor shaft by clutch means, not shown, but of any suitable conventional type. When so uncoupled, the rotors will be "windmilled" by the relative wind of descent, producing sufficient lift to preclude a stall, a dive, or a too-rapid loss of altitude.

The plane of rotation of the rear rotor is elevated a considerable distance above that of the forward rotor, so that although the two disks overlap, no indexing of the blades is required in order to prevent collision. By virtue of the same construction, the rotors may, if desired, be rotated in the same direction, instead of oppositely, as shown. In this case, rotor torque can be counteracted by inclining the rotor heads sufficiently widely in laterally opposite directions.

The differential elevation of the rotor disks also minimizes downwash of the front rotor onto the rear rotor and minimizes interference therewith the airstream flowing to that rotor. In all attitudes of the craft, therefore, the effect of the aerodynamics of one rotor upon the aerodynamics of the other is reduced to inconsequential proportions.

It is to be observed that no part of the power plant, the transmission system, or the control and trimming system occupies an undue portion of the volume of the fuselage. Consequently, an unusually large amount of space is left available for disposable loads.

Various refinements in and ramifications of the disclosed parts, and in the arrangement and combination thereof, are contemplated by the inventive concepts, and all are to be understood as lying within the scope of the sub-joined claims.

We claim:

1. A helicopter, including direct-lift sustaining rotor units arranged in tandem, the rotor units having differential blade-loading coefficients, the lesser loaded rotor unit being located aftward of the other rotor unit, whereby, upon longitudinal pitching of the craft, restoring moments are created by said differentially-loaded sustaining rotor units which automatically return the craft to its original longitudinal trim.

2. In an aircraft, at least one direct-lift sustaining rotor unit situated near the forward end of the longitudinal axis thereof; and at least one direct-lift sustaining rotor unit situated near the aft end of said axis and having a lower blade-loading coefficient than that of the forward sustaining rotor unit.

3. In a helicopter, at least one direct-lift sustaining rotor unit situated near the forward end of the longitudinal axis thereof; and at least one direct-lift sustaining rotor unit situated near the aft end of said axis; the blades of the aftward rotor-unit having a lesser angle of incidence, and a lesser inherent or "built-in" thrust coefficient and a normally greater angular velocity, than the blades of the forward rotor-unit, whereby the aftward rotor while normally being rotated to produce a total thrust equal to that of the forward rotor, is enabled to undergo a greater percentage of change of lift in pitching than is the front rotor thereby to longitudinally automatically stabilize the helicopter.

4. In a helicopter, a direct-lift sustaining unit situated near the forward end of the longitudinal axis thereof and a direct-lift sustaining unit situated near the aft end of said axis, the aft unit being endowed with a smaller blade loading coefficient and total loading than the forward lift unit and being located at a greater distance from the center of gravity than said forward unit, so as to have a vertical velocity in pitch greater than that of the forward lift unit, whereby to confer dynamic longitudinal stability upon the craft.

5. A longitudinally stable helicopter comprising: a fuselage having a center of gravity subject to wide variation of location in response to variations of useful loading of the fuselage; direct lift rotors mounted on said fuselage ahead of and behind the center of gravity, the rear rotor having an inherent ratio of total blade area to disk area greater than that of the front rotor; means for setting the effective angle of incidence of the blades of the rear motor to maintain it always less than that of the blades of the front rotor; and means for variably driving the rear rotor at rotational speeds always greater than those of the forward rotor; thereby to provide automatic longitudinal stability adequate to enable the useful load location of the center of gravity to be varied within a sufficiently wide range to enable employment of the helicopter to transport widely varying loads of both passengers and cargo.

6. A longitudinally stable helicopter comprising: a fuselage having a center of gravity subject to wide variation of location in response to variations of useful loading of the fuselage; direct lift rotors mounted on said fuselage ahead of and behind the center of gravity, the rear rotor having an inherent ratio of total blade area to disk area greater than that of the front rotor and a thrust coefficient less than that of the front rotor; means for setting the effective angle of incidence of the blades of the rear rotor to maintain it always less than that of the blades of the front rotor; and means for variably driving the rear rotor at rotational speeds always greater than those of the forward rotor; thereby to provide automatic longitudinal stability adequate to enable the useful load location of the center of gravity to be varied within a sufficiently wide range to enable employment of the helicopter to transport widely varying loads of both passengers and cargo.

7. A longitudinally stable helicopter comprising: a fuselage having a center of gravity subject to wide variation of location in response to variations of useful loading of the fuselage; direct lift rotors mounted on said fuselage ahead of and behind the center of gravity, the forward rotor normally lying closer to the center of gravity than the rear rotor, the rear rotor having an inherent ratio of total blade area to disk area greater than that of the front rotor; means for setting the effective angle of incidence of the blades of the rear rotor to maintain it always less than that of the blades of the front rotor; and means for variably driving the rear rotor at rotational speeds always greater than those of the forward rotor; thereby to provide automatic longitudinal stability adequate to enable the useful load location of the center of gravity to be varied within a sufficiently wide range to enable employment of the helicopter to transport widely varying loads of both passengers and cargo.

8. A longitudinally dynamically stable helicopter, comprising: a fuselage having a tail; direct lift rotors mounted on said fuselage ahead of and behind the center of gravity, the rear rotor having a longer moment arm about the center of gravity than the front rotor and a consequently greater angular bodily velocity in pitch than the forward rotor and having a diameter approximately the same as that of the forward rotor, a higher ratio of blade area to disk area than the forward rotor, and an angular velocity greater than that of the forward rotor all cooperating to confer a lower density loading on the rear rotor than on the front rotor; whereby the product of the changing lift of the pitching rear rotor as it approaches horizontal multiplied by its moment arm, coupled with the horizontal plate drag of the rear rotor, damp out potential oscillations of the tail about the horizontal trim position arising from the longitudinal restoring moments consequent upon the inherent longitudinal static stability of the helicopter.

9. In a helicopter, a direct-lift sustaining rotor-unit situated near the forward end of the longitudinal axis of the craft and a direct-lift sustaining rotor unit situated near the aft end of the longitudinal axis of the craft, the latter unit having a lesser blade angle of incidence and blade loading coefficient than the former unit so as to enable the two rotor units to longitudinally stabilize the craft; the center of gravity of the craft normally lying closer to the forward rotor-unit than it is to the rearward rotor unit so as to normally load the first-said unit with more of the total weight of the helicopter than is carried by the second-said unit; a source of power drivingly connected to said rotor-units so as to normally drive the aftward, lower blade-loaded rotor-unit at a sufficiently greater angular velocity than that of the forward rotor-unit to establish the normal longitudinal trim of the helicopter; and power-increasing means operatively connected to the aftward rotor and operable, when the craft's center of gravity is shifted rearwardly by changes in the location of the useful load of the craft, to increase the angular velocity of the rearward rotor sufficiently above normal to restore the longitudinal trim of the craft thereby to enable the craft to incorporate a wide range of location of its center of gravity.

AUSTIN B. CROSHERE, JR.
SCHUYLER KLEINHANS.
CARLOS C. WOOD.

REFERENCES CITED

The following references are of record in the file of this patent:

UNITED STATES PATENTS

| Number | Name | Date |
|---|---|---|
| 996,815 | Wait | July 4, 1911 |
| 1,738,010 | Klinker | Dec. 3, 1929 |
| 1,783,011 | Florine | Nov. 25, 1930 |
| 2,023,105 | Smith | Dec. 3, 1935 |
| 2,070,610 | Myers | Feb. 16, 1937 |
| 2,233,747 | Riedl | Mar. 4, 1941 |
| 2,273,303 | Waldron | Feb. 17, 1942 |
| 2,507,993 | Piasecki | May 16, 1950 |

FOREIGN PATENTS

| Number | Country | Date |
|---|---|---|
| 155,974 | Switzerland | Oct. 1, 1932 |
| 317,059 | Great Britain | Feb. 9, 1931 |
| 362,850 | Germany | Nov. 2, 1922 |

OTHER REFERENCES

Publication: "Journal of the Aeronautical Sciences," for June 1942, pp. 309–311, (Copy in Division 22).

Young, "Helicopter Engineering." Ronald Press, N. Y., 1949. Page 46.